US009823507B2

(12) United States Patent
Chae et al.

(10) Patent No.: US 9,823,507 B2
(45) Date of Patent: Nov. 21, 2017

(54) DISPLAY DEVICE

(71) Applicant: LG ELECTRONICS INC., Seoul (KR)

(72) Inventors: Sunki Chae, Seoul (KR); Jihee Park, Seoul (KR); Juyoung Joung, Seoul (KR); Kyungjoon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/767,852

(22) PCT Filed: Feb. 14, 2013

(86) PCT No.: PCT/KR2013/001166
§ 371 (c)(1),
(2) Date: Aug. 13, 2015

(87) PCT Pub. No.: WO2014/126279
PCT Pub. Date: Aug. 21, 2014

(65) Prior Publication Data
US 2016/0018699 A1 Jan. 21, 2016

(51) Int. Cl.
G02F 1/1335 (2006.01)
G09F 13/04 (2006.01)
G09F 13/14 (2006.01)

(52) U.S. Cl.
CPC .. *G02F 1/133606* (2013.01); *G02F 1/133603* (2013.01); *G02F 1/133605* (2013.01);
(Continued)

(58) Field of Classification Search
CPC ......... G02F 1/133606; G02F 1/133605; G02F 1/133603; G02F 2001/133607; G09F 13/04; G09F 2013/0422; G09F 2013/147
See application file for complete search history.

(56) References Cited

U.S. PATENT DOCUMENTS 8,876,325 B2 * 11/2014 Lu ..................... G02B 19/0066
362/217.02
2005/0243576 A1 11/2005 Park et al.
(Continued)

FOREIGN PATENT DOCUMENTS

JP 2013-016445 A 1/2013
KR 10-2005-0105838 A 11/2005
(Continued)

OTHER PUBLICATIONS

Park, Korean Patent Application Publication 10-2005-001050838,Nov. 2005,machine translation5.*
(Continued)

*Primary Examiner* — Tracie Y Green
(74) *Attorney, Agent, or Firm* — Dentons US LLP

(57) ABSTRACT

A display device, according to an embodiment of the present disclosure, includes a substrate, a light emitting unit comprising a light emitting element mounted on the substrate and a lens placed on the upper side of the light-emitting element, a reflective layer arranged on the upper surface of the substrate, an optical sheet arranged on the upper side of the reflective layer and disposed at a height spaced apart from the light emitting unit; and a display panel placed on the upper surface of the optical sheet, wherein a center portion of the upper surface of the lens is recessed at a predetermined depth and formed in the shape of a continuous straight line, and the upper surface thereof has an aspheric shape that is curved at a predetermined curvature from the center portion toward the edges, so as to have an anisotropic distribution of light.

17 Claims, 4 Drawing Sheets

(52) U.S. Cl.
CPC .. *G09F 13/04* (2013.01); *G02F 2001/133607* (2013.01); *G09F 2013/0422* (2013.01); *G09F 2013/147* (2013.01)

(56) References Cited

U.S. PATENT DOCUMENTS

2006/0193149 A1* 8/2006 Noh ................... G02B 6/0018
362/611
2013/0013252 A1 1/2013 Ono et al.

FOREIGN PATENT DOCUMENTS

| KR | 10-2006-0055706 A | 5/2006 |
| KR | 10-2006-0133784 A | 12/2006 |
| KR | 10-2012-0118565 A | 10/2012 |

OTHER PUBLICATIONS

Gang Korean Patent Application Publication 10-2012-0118565,Oct. 2012,machine translation.*

* cited by examiner

[Fig. 1]
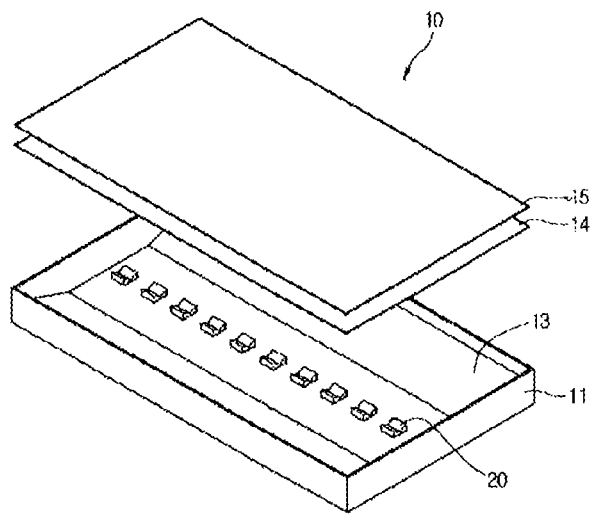
[Fig. 2]
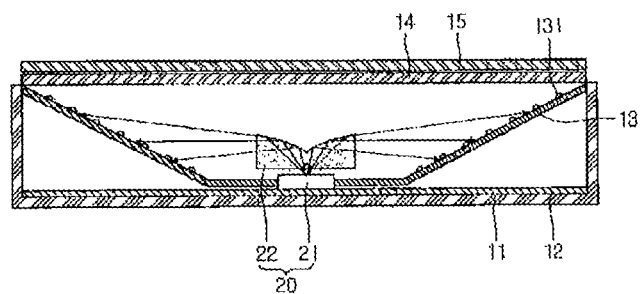
[Fig. 3]
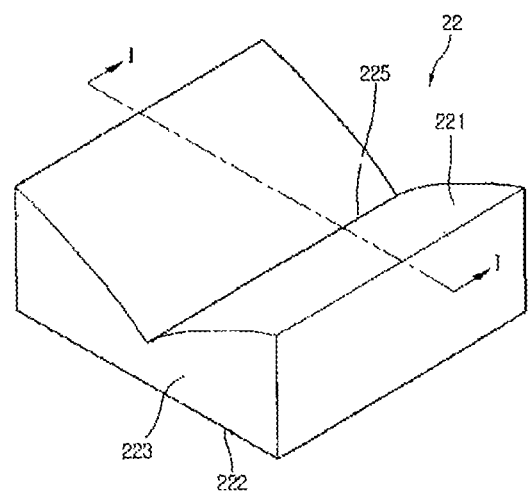

[Fig. 4]
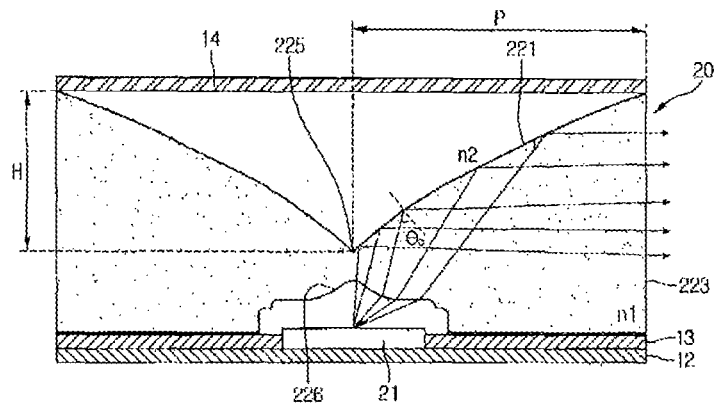
[Fig. 5]
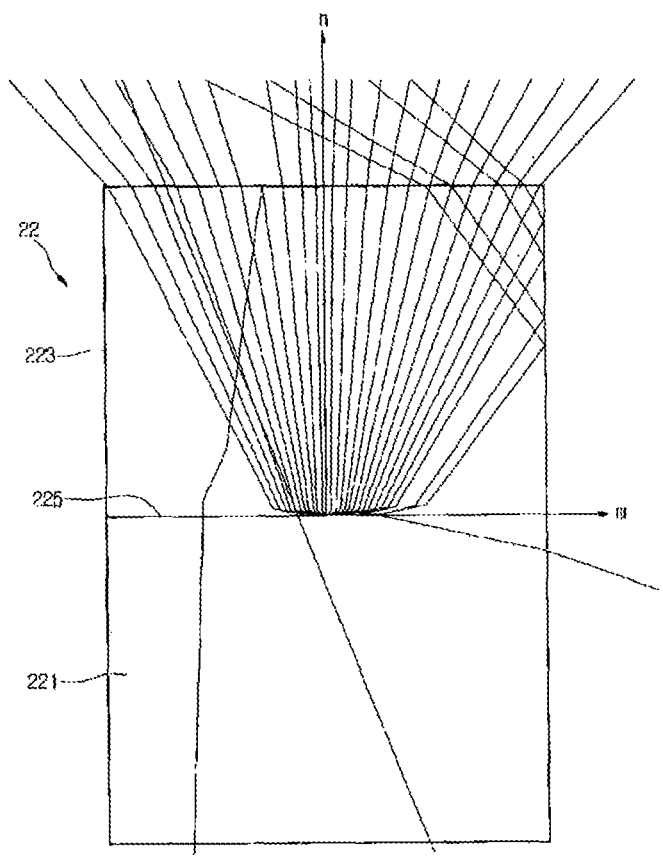

[Fig. 6]
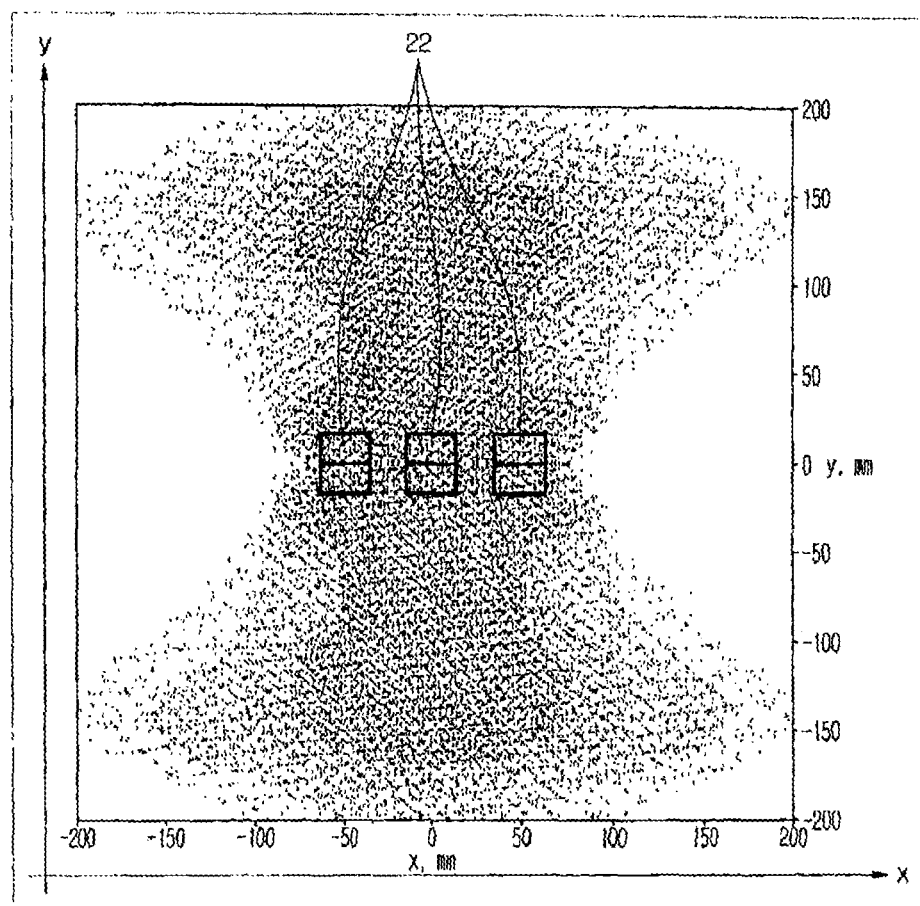

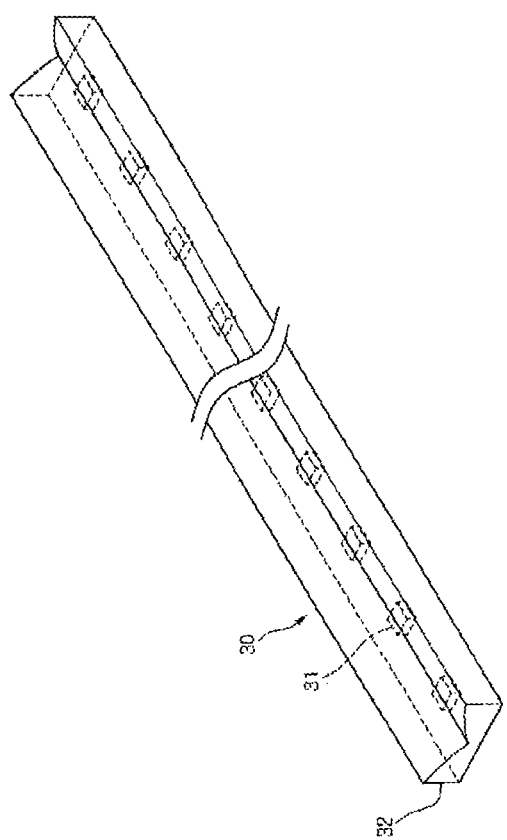

DISPLAY DEVICE

This application is a National Stage Application of International Application No. PCT/KR2013/001166, filed Feb. 14, 2013, which is hereby incorporated by reference in its entirety for all purposes as if fully set forth herein.

TECHNICAL FIELD

The present disclosure relates to a display device.

BACKGROUND ART

As the information society is developed, demands for the display devices have been increased in a variety of forms. To meet the demands, recently, various display devices such as liquid crystal display (LCD) devices, plasma display panel (PDP) devices, electroluminescent display (ELD) devices, vacuum fluorescent display (VFD) devices, or the like have been studied and used.

The liquid crystal panel of the LCD device thereof includes a liquid crystal layer, and a thin film transistor (TFT) substrate and a color filter substrate, which are facing each other by interposition of the liquid crystal layer. Since the liquid crystal panel of the LCD device is not self-emissive, the liquid crystal panel of the LCD device may display an image using light provided from a backlight unit.

The conventional backlight unit using an isotropic lens has a structure in which light sources are orthogonally arranged or arranged in a beehive structure, and the lens spreads light emitted from the light sources in an isotropic light distribution. In the above-described structure, since a pitch between the light sources increases as the number of the light sources decreases, there is a disadvantage that it is difficult to spread away the light in an isotropic light distribution of a circular shape using a secondary lens.

DISCLOSURE

Technical Problem

The present disclosure is directed to providing a display device including an optical assembly capable of improving quality of a display image.

Specifically, the present disclosure is directed to providing a display device capable of reducing the number of light sources and achieving a uniform surface light source structure through an anisotropic light distribution.

Technical Solution

In one embodiment, a display device includes a substrate, a light emitting unit comprising a light emitting element mounted on the substrate and a lens placed on the upper side of the light-emitting element, a reflective layer arranged on the upper surface of the substrate, an optical sheet arranged on the upper side of the reflective layer and disposed at a height spaced apart from the light emitting unit, and a display panel placed on the upper surface of the optical sheet, wherein a center portion of the upper surface of the lens is recessed at a predetermined depth and formed in the shape of a continuous straight line, and the upper surface thereof has an aspheric shape that is curved at a predetermined curvature from the center portion toward the edges, so as to have an anisotropic distribution of light.

Advantageous Effects

According to the embodiment of the present disclosure, it is possible to reduce a thickness of a backlight unit and accordingly improve an exterior of a display device including the backlight unit.

Further, as a structure of a lens which totally reflects light emitted from a light-emitting element toward a lower side is applied to a light source provided in the backlight unit, it is possible to improve the light efficiency and the illumination uniformity and accordingly improve quality of an image displayed on the display device.

Further, as a lens having an anisotropic light distribution is applied to a light-emitting diode (LED) package of a top-view method, light emitted from a light source is totally reflected in parallel as much as possible. Thus, there is an advantage that the light is spread away. Therefore, there is an advantage that the light efficiency and the illumination uniformity uniformly remain even when the number of the light sources is reduced.

Further, as it is designed that a part of a reflection layer provided on a bottom portion of the backlight unit is inclined, light emitted from a light source is reflected toward a display panel as much as possible. Thus, there is an advantage that the light efficiency is improved.

Further, a member corresponding to a separate light-guiding layer is not required and thus a weight of the backlight unit can be reduced. As a result, it is possible to reduce a weight of the display device.

DESCRIPTION OF DRAWINGS

FIG. 1 is an exploded perspective view illustrating a structure of a display device according to an embodiment of the present disclosure.

FIG. 2 is a cross-sectional view of the display device.

FIG. 3 is a perspective view of an exterior of a light-emitting unit according to an embodiment of the present disclosure.

FIG. 4 is a longitudinal-sectional view taken along line I-I of FIG. 3.

FIG. 5 is a plan view illustrating a form in which light is reflected and refracted through a lens according to an embodiment of the present disclosure.

FIG. 6 is a diagram illustrating a simulation of a light distribution implemented by a light-emitting unit assembly to which a structure of a lens according to an embodiment of the present disclosure is applied.

FIG. 7 is a perspective view illustrating a structure of a lens according to another embodiment of the present disclosure.

MODES OF THE INVENTION

Hereinafter, the present invention will be described with reference to accompanying drawings. Hereinafter, embodiments of the present disclosure can be modified to various forms, and the scope of the embodiments is not limited to the embodiments to be described below. The embodiments of the present disclosure are provided in order to fully explain the invention for those skilled in the art. Therefore, shapes and sizes of the elements in the drawings may be exaggerated for a more precise description.

FIG. 1 is an exploded perspective view illustrating a structure of a display device according to an embodiment of the present disclosure. FIG. 2 is a cross-sectional view of the display device.

Referring to FIGS. 1 and 2, a display device 10 according to an embodiment of the present disclosure includes a display panel 15 which displays an image, a backlight unit which is provided behind the display panel 15 and emits light toward the display panel 15, and an optical sheet 14 which diffuses and processes light emitted from the backlight unit.

Specifically, the optical sheet 14 includes a diffusion sheet and a prism sheet. The backlight unit may include a light-emitting diode (LED) as a light source and use a top-view method in which the light emitted from the light source is directed toward the display panel 15.

The backlight unit includes a substrate layer 12 placed on a bottom of a panel case 11, light-emitting units 20 mounted on the substrate layer 12, and a reflective layer 13 placed on an upper surface of the substrate layer 12.

Specifically, the light-emitting units 20 may be arranged on a center portion of the reflective layer 13 at a predetermined interval in a line. Parts of the reflective layer 13 corresponding to both side areas of the light-emitting units 20 may form inclined surfaces which are inclined toward an upper side thereof As the parts of the reflective layer 13 are formed to be inclined, light, which is emitted from the light-emitting unit 20 and refracted to the reflective layer 13, is reflected toward the optical sheet 14, and thus the light efficiency may be improved. A reflection pattern or a light extraction pattern 131 may be formed on an upper surface of the reflective layer 13, and the light emitted from the light-emitting unit 20 may be bumped to the pattern to be reflected toward the display panel 15.

The substrate layer 12 may be a printed circuit board (PCB) substrate formed using polyethylene terephthalate, glass, polycarbonate, silicon, or the like, and may be provided in a film form.

Meanwhile, the light-emitting unit 20 includes a light-emitting element 21 including an LED, and a lens 22 coupled to an upper side of the light-emitting element 21. The light-emitting element 21 may be an LED package using a top-view method, in which a light-emitting surface is formed toward the upper side thereof, and may emit light toward an upper side thereof with an oriented angle of about 120 degree. Most of the light emitted from the light-emitting element 21 is totally reflected by the lens 22 toward a side thereof Therefore, the lens 22 is provided on the upper side of the light-emitting element 21, and thus, a thickness of the backlight unit may be reduced and the light efficiency and the illumination uniformity may be improved.

Further, a light-guiding layer may be formed between the reflective layer 13 and the optical sheet 14 and the light-guiding layer may be filled with air or may remain in a vacuum state.

Hereinafter, a configuration of the light-emitting unit according to the embodiment of the present disclosure will be described in detail.

FIG. 3 is a perspective view of an exterior of the light-emitting unit according to the embodiment of the present disclosure. FIG. 4 is a longitudinal-sectional view taken along line I-I of FIG. 3.

Referring to FIGS. 3 and 4, the light-emitting unit 20 according to the embodiment of the present disclosure includes the light-emitting element 21 and the lens 22 provided on the upper side of the light-emitting element 21. As described above, the light-emitting element 21 includes the LED package and the LED package includes a sub-mount substrate and an LED element mounted on the sub-mount substrate. The sub-mount substrate is a transparent material and may be a transparent polymer material including glass, transparent ceramic, or a resin.

Specifically, the lens 22 may be formed in an aspheric shape, in which a light-emitting surface has a parabolic shape, so as to induce the total reflection of the light emitted from the light-emitting element 21 and transmit the light toward a side thereof More specifically, the lens 22 includes an upper surface portion 221, a lower surface portion 222, a side surface portion 223, and a center portion 225.

Specifically, the upper surface portion 221 of the lens 22 is curved at a predetermined curvature and has an aspheric shape. As an example, the upper surface portion 221 of the lens 22 may be formed in a parabolic shape. The center portion 225 of the lens 22 is formed in a shape which is recessed at a very close distance from the upper side of the light-emitting element 220.

Further, a bottom center portion 226 may be formed on a center of the lower surface portion 222 of the lens 22, and the bottom center portion 226 may serve to reduce a yellowish phenomenon of an upper surface of the lens by spreading the light emitted from the light-emitting element 21 to be incident on the upper surface portion 221 of the lens 22. A cross section of the bottom center portion 226 may have various shapes such as a half circle shape, an oval shape, and an inclined straight line shape. As an experimental result, when the shape of the bottom center portion 226 is a round curved shape, it may be seen that a hot spot, which is one point on which the light is focused may be minimized, and the light is incident on the upper surface portion 221 of the lens 22 while the light is widely spread. Also, the bottom center portion 226 may be an air layer, and as another embodiment, it is possible to insert a separate lens to the bottom center portion 226. The separate lens may be molded into the light-emitting element 21 as a resin in which phosphors are mixed.

Meanwhile, the upper surface portion 221 of the lens 22 may serve to totally reflect the light, which is emitted from the light-emitting element 21 toward an upper side thereof, toward a side thereof A total reflection angle $\theta_c$ is defined by the Snell's law as follows.

$\sin\theta_c = (n2/n1)$, where n1 is a refractive index of a lens and n2 is a refractive index of air.

Since a refractive index of polycarbonate is about 1.58, it is appropriate that a critical angle $\theta_c$ for the total reflection is about 42 degree when the polycarbonate is used as a material of the lens 22. Therefore, it is preferable that a curvature of the upper surface portion 221 is provided so that an incidence angle of light incident on the upper surface portion 221 is 42 degree or more. Then, most of the light incident on the upper surface portion 221 of the lens 22 is totally reflected to be diffused inside the light-guiding layer, and only some of the light passes through the lens 22 to move toward the display panel 15. Here, a light-shielding pattern layer is formed on the upper surface of the lens 22 and thus some of light proceeding toward the display panel 15 may be re-reflected to the light-guiding layer.

Meanwhile, the center portion 225 of the lens 22 may be recessed at a closest distance from the bottom center portion 226. A degree of spreading of the light incident on the lens 22 is determined by a depth H of the center portion 225 of the lens 22/a pitch P of the upper surface portion 221 of the lens 22. The pitch of the upper surface portion of the lens refers to a distance from the center portion 225 of the lens 22 to an edge at which a curved surface of the upper surface portion of the lens 22 ends. Hereinafter, a value of the H/P which refers to the degree of the spreading of the light incident on the lens 22 is defined as a luminous intensity distribution of the lens. The total reflection of the light is increased as a value of the luminous intensity distribution is increased, and thus the light is uniformly spread away.

As an experimental result, it may be seen that while the hot spot is reduced and loss of light is reduced as the value of the luminous intensity distribution is increased, the hot spot is increased and the loss of light is increased as the value of the luminous intensity distribution is reduced. Since the loss of light is rapidly increased when the luminous intensity distribution is less than 0.3, it is preferable that the luminous intensity distribution is 0.3 or more, and more preferably, about 0.5.

Further, the center portion 225 of the lens 22 horizontally extends from the left edge of the lens 22 to the right edge thereof in a straight line. That is, the lens 22 has a shape similar to an open book shape.

Further, all longitudinal sections, which passes through any point of the center portion 225 and is cut by a vertical surface which extends in a direction perpendicular to a virtual line passing through the center portion 225, has the same shape as a shape of the side surface portion of the lens 22. A conventional isotropic lens has an aspheric shape from a center of the lens to the edges thereof, and shapes of longitudinal sections cut by a vertical surface passing through a center point of the lens are the same. Therefore, the conventional isotropic lens has an isotropic light distribution in which light emitted from the light-emitting element is spread in all direction from the center of the lens.

However, in the embodiment of the present disclosure, most of light emitted to side surfaces of the lens 22 is totally reflected and spread in a vertical direction based on the center portion 225 of the lens. A light distribution of the light-emitting unit according to the embodiment of the present disclosure will be described in detail with reference to the drawing below.

FIG. 5 is a plan view illustrating a form in which light is reflected and refracted through the lens according to the embodiment of the present disclosure.

Referring to FIG. 5, both side surface portions of the lens 22 according to the embodiment of the present disclosure are in a straight line. That is, a straight line passing through the both side surface portions of the lens 22 is perpendicular to a straight line passing through the center portion of the lens.

As illustrated above, light, which is emitted from the light-emitting element 21 and is incident on the lens 22, is incident on the upper surface portion 221 and side surface portion 223 of the lens 22. The light incident on the upper surface portion 221 is totally reflected and emitted in a direction (+n-axis and −n-axis directions) crossing a line passing through the center portion 225 of the lens 22. The +n-axis and −n-axis directions may be defined as a width direction of the display panel.

Specifically, in a top view of the lens 22, some of the light passing through the center portion 225 among light emitted toward the side surface portions 223 may pass through and may be transmitted in a horizontal direction. However, most of the remaining light emitted to the side surface portions 223 is totally reflected and spread in the n-axis direction. A light distribution, in which light meets air containing a different medium to be refracted and diffused in a circular sector shape, is formed on an end portion of the lens 22 in the n-axis direction.

As described above, as a plan structure of the lens 22 has a rectangular shape so that the lens 22 has an anisotropic light distribution and a side cross-sectional structure has an open book shape, the light emitted from the light-emitting element 21 is not isotropically spread, but may be focused in one axis (n-axis) direction to be spread away. As a result, even when the number of the light-emitting elements 21 is reduced in the display panel of the same size, there is an advantage that the light efficiency is not reduced.

As illustrated in FIG. 1, even when the light-emitting units may be arranged at a predetermined interval only in a longitudinal direction without being arranged in a horizontal direction of the backlight unit, the same light efficiency may be obtained. As a result, there is an advantage that the number of the light-emitting units installed on the backlight unit is reduced.

FIG. 6 is a diagram illustrating a simulation of a light distribution implemented by a light-emitting unit assembly to which a structure of the lens according to the embodiment of the present disclosure is applied.

Referring to FIG. 6, the simulation illustrates a light distribution in which three light-emitting units are arranged at an interval of 60 mm in a longitudinal direction of the display panel and an optical gap of the backlight unit is 20 mm. Here, the optical gap refers to a straight linear distance from the light-emitting unit 20 to the optical sheet 14. A thickness of the backlight unit may be substantially determined by the optical gap.

In the drawing, an x-axis refers to a longitudinal direction of the display panel and a y-axis refers to a width direction of the display panel. That is, a part of a shorter length is the width direction, a part of a longer length is the longitudinal direction, and the three light-emitting units 20 are arranged in the longitudinal direction in FIG. 1.

As it may be seen from the simulation result, when the plurality of light-emitting units 20 are arranged at a predetermined interval, it may be seen that light is diffused in a direction parallel to the display panel in each of the light-emitting units 20, a distance of the light distribution is formed short in a direction parallel to a line passing through the center portion 225 of the lens 22 and is formed long in a direction crossing the line passing through the center portion 225. It may be seen that the light diffused in each of the light-emitting units 20 partially interferes and thus the brightness of the light almost uniformly remains in the inner part.

Specifically, it may be seen that the light emitted through the side surface portion (a side surface of the n-axis in FIG. 5) of the lens in one light-emitting unit is spread at a distance corresponding to a width of the display panel. However, since the light is not refracted and transmitted in another side part (a side surface of an m-axis in FIG. 5) of the lens and most of the light is totally reflected, a gap area in which the light is ineffectively spread may be generated in a cutout portion area. Therefore, in order to minimize the gap area, it may be designed that a distance between adjacent light-emitting units is appropriately adjusted and a light distribution area partially overlaps. Of course, as the optical sheet 14 is placed in the gap area, the brightness is uniformly adjusted over the entire display panel and a surface light emission is implemented. That is, since some of light emitted to the optical sheet 14 is re-reflected and moved again toward the reflective layer 13, such a gap area may be removed.

According to the above-described structure, the number of the arranged light-emitting units may be determined according to a length of the display panel, and a specification of the light-emitting element or a length of the aspheric surface of the lens may be determined according to a length of the width of the display panel.

FIG. 7 is a perspective view illustrating a structure of a lens according to another embodiment of the present disclosure.

Referring to FIG. 7, in the embodiment of the present disclosure, a lens 32 constituting a light-emitting unit 30 is formed in a single long rod shape.

Specifically, un upper surface extends in an extension direction of a straight line passing through a center portion of the lens 32. A shape of a longitudinal section of the lens cut by a vertical surface in a direction perpendicular to the straight line passing through the center portion of the lens 32 is the same as that of the previous embodiment of the present disclosure. That is, the shape of the longitudinal section has an open book shape. An upper surface of the lens 32 has a different shape from a lens which forms an aspheric surface having the same curvature in a circumferential direction based on a center point. That is, the center portion which is recessed from the upper surface of the lens 32 according to the embodiment of the present disclosure extends to have a continuous straight line shape, and the shape of the longitudinal section cut by the vertical surface perpendicular to the extension direction of the center portion at any point of the center portion has the same structure at all points of the center portion. Recessed portions for disposing a plurality of light-emitting elements 31 at a predetermined interval are formed on a bottom of the lens 32. A length of the lens 32 may be increased so as to include both the light-emitting element 31 disposed on an edge of one side and the light-emitting element 31 disposed on an edge of another side.

The invention claimed is:

1. A display device comprising:
   a substrate;
   a light-emitting unit including:
      a light-emitting element mounted on the substrate; and
      a lens placed on an upper side of the light-emitting element;
   a reflective layer placed on an upper surface of the substrate;
   an optical sheet placed on an upper side of the reflective layer at a height spaced apart from the light-emitting unit; and
   a display panel placed on an upper surface of the optical sheet,
   wherein the lens comprises
   a upper recess portion formed by downwardly recessing a top surface thereof,
   and a lower recess portion formed by upwardly recessing a bottom surface thereof,
   wherein the upper recess portion has an aspheric shape that is curved at a predetermined curvature from a center of the upper recess portion toward edge,
   wherein the lower recess portion comprises a side surface and a convex surface that is convex toward a top surface of the light-emitting element,
   wherein a height of a center of the lower recess portion from the bottom surface is higher than a height of the side surface.

2. The display device of claim 1, wherein a center portion of the upper surface of the lens is recessed lower than the edge.

3. The display device of claim 2, wherein the upper surface of the lens has a parabolic shape, and wherein a longitudinal section cut by a vertical surface perpendicular to the continuous straight line has an open book shape.

4. The display device of claim 3, wherein shapes of the longitudinal sections cut by the vertical surface at all points defining the center portion of the upper surface are identical to each other.

5. The display device of claim 4, wherein a shape of the lens in a top view is a rectangular shape.

6. The display device of claim 1, wherein, when H is defined as a vertical distance from a center portion of the upper recess portion to the edge of the upper surface of the lens in the longitudinal section cut by the vertical surface perpendicular to the continuous straight line, and P is defined as a horizontal distance from the center portion of the upper recess portion to a point at which a round portion of the upper surface of the lens ends, 0.3≤H/P≤0.5.

7. The display device of claim 1, wherein a longitudinal section of the convex surface is symmetrical in all direction around a center of the lower recess portion.

8. The display device of claim 1, wherein at least a part of the reflective layer is formed to be inclined upwardly towards an edge thereof.

9. The display device of claim 1, wherein the light-emitting element is provided in plurality,
   and wherein the plurality of light-emitting elements are arranged at a predetermined interval in a longitudinal direction of the display panel, and the lens is placed on an upper side of each of the light-emitting elements.

10. The display device of claim 1, wherein the light-emitting element is provided in plurality,
    wherein the plurality of light-emitting elements are disposed at a predetermined interval in a longitudinal direction of the display panel,
    and wherein the lens extends in the same direction as an extending direction of a straight line passing through the upper surface of the lens and to have a length accommodating all the plurality of light-emitting elements.

11. The display device of claim 1, wherein the longitudinal section of the convex surface has an open book shape.

12. The display device of claim 1, wherein the center of the lower recess portion is higher than an edge of convex surface.

13. The display device of claim 1, wherein the side surface is perpendicular to the bottom surface of the lens.

14. The display device of claim 13, wherein the side surface is connected to an edge of the convex surface.

15. The display device of claim 1, wherein a side surface of the lens is connected to an edge of the top surface of the lens,
    wherein the side surface of the lens has a straight region,
    wherein a height of the upper recess portion is different from a height of the straight region.

16. The display device of claim 1, wherein the reflective layer comprises a hole surrounding a side surface of the light-emitting element,
    wherein an area of the lower recess portion is different from an area of the hole.

17. The display device of claim 1, wherein a shape of the lens in a bottom view is a rectangular shape.

* * * * *